US000001432H

United States Statutory Invention Registration [19]

[11] Reg. Number: H1432

Skochdopole

[43] Published: Apr. 4, 1995

[54] POLYCARBONATE-BLOCK COPOLYMER BLEND WITH IMPROVED SOLVENT AND IMPACT RESISTANCE

[75] Inventor: Richard E. Skochdopole, Midland, Mich.

[73] Assignee: The Dow Chemical Company, Midland, Mich.

[21] Appl. No.: 873,336

[22] Filed: Apr. 20, 1992

Related U.S. Application Data

[63] Continuation of Ser. No. 655,241, Feb. 12, 1991, abandoned, which is a continuation of Ser. No. 232,256, Aug. 15, 1988, abandoned.

[51] Int. Cl.[6] ..... C08L 53/00

[52] U.S. Cl. ..... 525/92 E

[58] Field of Search ..... 525/92

[56] References Cited

U.S. PATENT DOCUMENTS

| | | | |
|---|---|---|---|
| 4,088,711 | 5/1978 | Gergen et al. | 260/873 |
| 4,122,131 | 10/1978 | Bussink et al. | 260/873 |
| 4,267,096 | 5/1981 | Bussink et al. | 525/96 X |
| 4,424,303 | 1/1984 | Liu | 525/67 |
| 4,537,930 | 8/1985 | Bussink et al. | 524/505 |
| 4,579,903 | 4/1986 | Liu et al. | 524/508 |
| 4,628,072 | 12/1986 | Shiraki et al. | 525/57 |
| 4,737,545 | 4/1988 | Liu et al. | 525/92 |

*Primary Examiner*—Shean Wu

[57] ABSTRACT

A modified polycarbonate composition comprising a blend of a bisphenol A-based polycarbonate and from greater than about 5% and less than about 15% by weight of a high molecular weight hydrogenated styrene-butadiene-styrene triblock copolymer has dramatically improved environmental stress crack resistance as well as improved impact resistance properties.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYCARBONATE-BLOCK COPOLYMER BLEND WITH IMPROVED SOLVENT AND IMPACT RESISTANCE

This is a continuation of U.S. patent application Ser. No. 655,241, filed Feb. 12, 1991, now abandoned, which is a continuation of Ser. No. 232,256, filed Aug. 15, 1988, now abandoned.

BACKGROUND OF THE INVENTION

The present invention relates generally to modified polycarbonate compositions with improved impact and environmental stress crack resistance properties. More particularly, the present invention relates to blends of aromatic polycarbonates and high molecular weight hydrogenated styrene-butadiene-styrene triblock copolymers.

Aromatic polycarbonates are well known commercially available materials having a variety of applications in the plastics art. Generally speaking, these resins offer high resistance to attack by mineral acids, have high tensile strength and high impact strength, except in thick sections, good thermal resistance and a dimensional stability far surpassing that of most other thermoplastic materials.

The use of aromatic polycarbonate resins in certain applications is limited, however, because they have a high viscosity in the melt, making molding of complex large and especially formed parts difficult. They also exhibit brittleness under sharp impact conditions in thick section and, regardless of thickness, when small amounts of reinforcements such as glass, or pigments such as titanium dioxide, are added for conventional purposes. In addition, polycarbonate resins exhibit severe environmental stress cracking. The term "environmental stress cracking" refers to the type of premature failure under stress which is hastened by the presence of organic solvents, e.g., acetone, heptane and toluene, when such solvents are in contact with stressed articles fabricated from aromatic polycarbonate resins. Such contact may occur, for example, when solvents are used to clean or degrease stressed parts fabricated from polycarbonates, or when such parts are used around gasoline engines in automotive and recreational applications.

As a result, polycarbonate polymers have been modified by or blended with additional polymers to achieve materials with the desired combination of properties. For example, in U.S. Pat. No. 4,088,711 polycarbonates are combined with block copolymers of a monoalkenyl arene polymer and a completely hydrogenated conjugated diene to form a continuous interlocking network, with the block copolymer acting as a mechanical structural stabilizer. The compositions described in U.S. Pat. Nos. 4,537,930, 4,267,096 and 4,122,131 are blends of polycarbonates and small amounts of vinyl aromatic and olefin elastomer copolymers having improved environmental stress crack resistance. U.S. Pat. No. 4,628,072 describes the improvement of physical properties such as adhesion, impact resistance, weatherability and heat resistance by the addition of block copolymers of a monovinyl substituted aromatic hydrocarbon polymer and unsaturated olefin compound polymer to various thermoplastic polymers. See also U.S. Pat. No. 4,579,903 directed to copolyester carbonate resin compositions incorporating copolymers of vinyl aromatic compounds and olefinic elastomers which provide improved solvent resistance and impact properties.

The present invention is directed toward novel polycarbonate compositions having markedly improved environmental stress crack resistance as well as improved impact resistance properties.

SUMMARY OF THE INVENTION

The present invention comprises a blend of an aromatic polycarbonate polymer and a block copolymer comprising an alkenyl arene polymer and a hydrogenated diene elastomer. Preferably the aromatic polycarbonate is a biphenol-based polycarbonate such as bisphenol A, and the block copolymer is a hydrogenated styrene-butadiene-styrene triblock copolymer of a molecular weight greater than about 130,000 and present in amounts greater than about 5% to less than about 15% of the composition by weight. All percentages given herein are by weight unless otherwise indicated. Compositions of the present invention exhibit markedly increased environmental stress crack resistance and improvements in impact resistance properties.

DESCRIPTION OF THE PREFERRED EMBODIMENT OF THE INVENTION

The present invention comprises a blend of an aromatic polycarbonate polymer and a block copolymer comprising an alkenyl arene polymer and a hydrogenated diene elastomer. The block copolymer is of relatively high molecular weight and is present in an amount effective to improve the environmental stress crack resistance of the polycarbonate blend. The amount of copolymer present in the blend is preferably such that substantial improvement of environmental stress crack resistance relative to unmodified polycarbonate is obtained. By "substantial improvement" is meant at least about a 100% increase in the time to fail at a constant stress of 1500 psi in 75% by volume isooctane and 25% by volume toluene relative to unmodified polycarbonate.

Aromatic polycarbonates suitable for compositions of the present invention include, for example, polymers derived from diphenols such as bisphenol A, 1,1(4 hydroxyphenol)ketone, bis-(4-hydroxyphenyl)methane, 1,1-bis-(hydroxyphenyl)-ethane, phenolphthalein, and 1,1 bis(hydroxyphenol) sulfone; and aromatic polycarbonates with alkyl or halogen substituents on the phenyl ring. Preferably, the polycarbonate component of a blend of the present invention is a bisphenol A-based polycarbonate with a melt flow of from about 3 to about 80 g/10 min run at 300° C. and 3.8 kg wt (ASTM) condition O, and more preferably with a melt flow of from about 4.6 to about 15 g/10 min condition O.

Suitable block copolymers for blends of the present invention are alkenyl arene-hydrogenated diene triblock copolymer of a relatively high molecular weight. Suitable structural arrangements of block copolymers useful in compositions of the present invention include linear triblock copolymers or, alternatively, for example, star block copolymers. More preferred are alkenyl arene-diene-alkenyl arene linear triblock copolymers. Most preferred are hydrogenated styrene-butadiene-styrene linear triblock elastomers. Block copolymers suitable for compositions of the present invention are also those of a relatively high molecular weight. Suitable copolymers include those of a molecular weight of greater than about 70,000, and more preferably, greater than about 130,000. Most preferred are block copolymers of a molecular weight of about 175,000.

Suitable compositions ranges of the block copolymer in a blend of the present invention include greater than from about 5% block copolymer, more preferably from greater than about 5% to less than about 15%, and still more preferably from about 8% to about 12% block copolymer. Most preferably, the block copolymer comprises about 10% of a blend of the present invention. Although the block copolymer must be present in an amount to impart improved environmental stress crack resistance properties to the blend, too high an amount of block copolymer may adversely affect the molding properties of the blend. By "adversely affects" is meant that the blend shows gross nonhomogeneity upon molding, giving a very poor surface and a layered structure that shows some poor physical properties. Thus, although preferred ranges are given, they should not be construed as limiting and should be selected to maximize the environmental stress cracking resistance without adversely affecting molding properties and fabrication. It should also be appreciated that, as more fully described below in Specific Examples IX and X, at the preferred concentrations the block copolymer does not form an interconnecting network in the blend.

Compositions of the present invention comprising an aromatic polycarbonate and block copolymer can also include additional resins, preferably in amounts of less than about 50% of the final blend. Suitable additional resins for compositions of the present invention include engineering resins such as acrylonitrile-butadiene-styrene copolymer (ABS), polybutylene terephthalate (PBT), polyethylene terephthalate (PET), nylon and polyacetal resins.

The components of the subject composition can be blended by any technique which effects intimate intermixing of components without significant mechanical or thermal degradation of the polymer components. For example, the components can be dissolved or dispersed in a compatible diluent, blended together to produce a homogenous dispersion or solution and the diluent removed.

One particularly convenient method for preparing blends of the present invention is to first dry blend particulates of each respective component. This dry blend is directly fed into a heat fabricating apparatus such as a screw extruder or a reciprocating screw injection molding machine with sufficient mixing. While the particular manner of mixing these components in heat plasticized form is not critical, sufficient mixing should be employed to ensure a uniform distribution of each of the components throughout the resulting blend. In addition to the foregoing mixing procedures, other conventional mixing procedures may be employed including hot roll milling, kneading and the like. The preferred method of blending the polymer components of the present invention is by extrusion at a temperature and shear rate which will effect intimate mixing without significant polymer degradation.

Any of the various types of extrusion devices capable of bringing polymeric components into the melted state and providing a continuous or intermittent flow of the composition through the die may be employed to prepare a composition of the invention. Such devices can include single screw, double screw, or multiple screw extruders having either a planetary screw or plate or both for transformation of the mixtures into finished or semifinished products.

A preferred composition of the present invention comprises a blend of a bisphenol A-based polycarbonate and a hydrogenated styrene-butadiene-styrene linear block copolymer. The polycarbonate is of the general structure

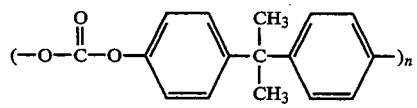

where n is preferably selected to provide the polycarbonate with a weight average molecular weight of about 31,000. The block copolymer is preferably of a molecular weight of about 175,000, where the styrene unit molecular weights are about 25,000 and the butadiene unit molecular weights are about 125,000.

Suitable amounts of styrene-butadiene-styrene block copolymer in preferred compositions of the invention includes greater than about 5% block copolymer, more preferably from greater than about 5% to less than about 15% block copolymer, and still more preferably from about 8% to 12% block polymer. Most preferred is a blend of about 10% hydrogenated styrene-butadiene-styrene triblock copolymer and about 90% bisphenol A polycarbonate.

Compositions of the present invention exhibit a dramatic increase in environmental stress crack resistance toward organic solvents and improved impact resistance. Such improved solvent and impact resistance is documented by the data summarized in the specific examples which follow.

SPECIFIC EXAMPLES

Example I

A polymer composition of 85 parts polycarbonate with 4.6 melt flow rate and 15 parts of a hydrogenated styrene-butadiene-styrene triblock polymer of a molecular weight of approximately 175,000, commercially available from Shell Chemical Company as Kraton® G1651, was compounded on a Werner & Pfleiderer ZSK30 twin screw extruder through a strand die, water bath and chopper. These granules were then injection molded on a Newbury 30-ton injection molder.

Prior to compounding, the polycarbonate was dried at least four hours at 121° C. and Kraton® G1651 was dried at least 16 hours at 61° C., both in circulated air ovens. The resins were then dry-blended in a Hobart planetary mixer for at least one minute prior to loading into the compounding hopper. The extruder was run at about 30 lb/hr rate with heating zones set from 260° to 280° C.

This composition was again dried for over four hours at 121° C. prior to molding on the Newbury Injection Molder. The injection molding heaters were set at 600° to 625° F. and the molding pressure was 3000 psi. The mold temperature was set at 150° F. Problems with poor surface were encountered during the entire molding trial and the sample also delaminated upon tensile testing, indicating that this composition was too high in Kraton® G1651 for good molding properties.

Examples II through V

The following compositions were prepared by a similar procedure outlined in Example I.

| Example | Polycarbonate | Elastomer |
|---|---|---|
| II | 90% | 10% Kraton® G1651 |

-continued

| Example | Polycarbonate | Elastomer |
|---|---|---|
| III | 95% | 5% Kraton ® G1651 |
| IV | 90% | 10% Acryloid ® KM330 |
| V | 100% | 0% |

Injection molded bars of each of the above compositions were exposed to a synthetic gasoline mixture of 75% by volume isooctane and 25% by volume toluene at various stress levels and the time observed at which the sample failed by rupture.

| | Time to Fail in Minutes at Designated Stress Level | | | | |
|---|---|---|---|---|---|
| Example | 3000 psi | 2500 psi | 2000 psi | 1500 psi | 1000 psi |
| II | 53 | 95 | 400 | 566 | 5,333 |
| III | 8 | 11 | 18 | 84 | 1,000 |
| IV | 13 | 25 | 42 | 90 | 900 |
| V | 4 | 7 | 26 | 166 | — |

These data show that although 5% Kraton ® G1651 shows no improvement in environmental stress crack resistance performance, 10% Kraton ® G1651 is much improved compared to pure polycarbonate. The data of Example IV also indicates that another very commonly used elastomer for impact toughening, a methyl methacrylate shell/butylacrylate core multipolymer commercially available from Rohm & Haas Company as Acryloid ® KM330, does not improve the environmental stress crack resistance performance of polycarbonate.

Examples VI through VIII

Polymer samples with the following compositions were prepared and molded in a manner similar to Example I. In this case, good surfaces were obtained with all samples. The toughness qualities of these materials were evaluated by measuring the Notched Izod Impact (ASTM D256) at different notch sizes, temperatures, and after elevated temperature aging. The results were as follows:

| | | Notched Izod, RT | | 0° F. | 131° C. Aging 10 mil NI | |
|---|---|---|---|---|---|---|
| Example | Composition | 10 mil | 5 mil | 10 mil | 24 hr | 20 hr |
| VI | 5% Kraton ® G1651 | 16.8 | 14.2 | 15.8 | 14.4 | 13.0 |
| VII | 5% Kraton ® G1650[a] | 13.8 | 10.8 | 7.1 | 3.7 | 3.3 |
| VIII | 5% Kraton ® G1652[b] | 13.2 | 10.8 | 11.8 | 6.0 | — |

[a]Kraton ® G1650 is a hydrogenated styrene-butadiene triblock polymer of a molecular weight of about 70,000, available commercially from Shell Chemical Company.

[b]Kraton ® G1652 is a hydrogenated styrene-butadiene triblock polymer of a molecular weight of about 50,000, available commercially from Shell Chemical Company.

As seen from the above data, the impact properties of the higher molecular weight Kraton ® G1651 was clearly superior to the other two lower molecular weight Kraton ® G materials.

Examples IX through X

Transmission electron micrographs were taken in directions perpendicular and parallel to flow in an injection molded test bar of 90% polycarbonate and 10% Kraton ® G1651.

The Kraton ® light colored domains do not interconnect in any direction to form and interlocking network, but instead remain discretely dispersed in the blend.

It should be appreciated that a latitude of modification, change and substitution is intended in the foregoing disclosure and, accordingly, it is appropriate that the appended claims be construed broadly and in a manner consistent with the spirit and scope of the invention herein.

What is claimed is:

1. A toughened polycarbonate composition with improved environmental stress crack resistance comprising:

an aromatic polycarbonate; and an alkenyl-arene-diene-alkenyl-arene block copolymer in an amount greater than 5% by weight of the composition and effective to improve the environmental stress crack resistance of the composition relative to the aromatic polycarbonate, but in an amount less than that which adversely affects the molding properties of the blend.

2. The composition of claim 1, wherein the block copolymer is present in an amount greater than from about 5% to less than about 15% by weight of the composition.

3. The composition of claim 1, wherein the average molecular weight of the block copolymer is greater than about 70,000.

4. The composition of claim 1, wherein the block copolymer is a linear block copolymer of hydrogenated styrene-butadiene-styrene.

5. The composition of claim 1, wherein the block copolymer is a star block copolymer of styrene and hydrogenated butadiene.

6. The composition of claim 1, wherein the aromatic polycarbonate is a bisphenol A-based polycarbonate.

7. The composition of claim 1, wherein the aromatic polycarbonate is an aromatic ester copolycarbonate.

8. The composition of claim 1, further comprising an engineering resin present in an amount of less than about 50% by weight of the composition.

9. The composition of claim 2, wherein the block copolymer is present in an amount of from about 8% to about 12% by weight of the composition.

10. The composition of claim 4, wherein the molecular weight of the block copolymer is greater than about 130,000.

11. The composition of claim 8, wherein the engineering resin is selected form the group consisting of acrylonitrile-butadiene-styrene copolymer, polybutylene terephthalate, polyethylene terephthalate, nylon, polyacetal resin and mixtures thereof.

12. A thermoplastic blend comprising:

an aromatic polycarbonate; and a hydrogenated styrene-butadiene-styrene block copolymer present in an amount of greater than about 5% to less than about 15% by weight of the blend.

13. The blend of claim 12, wherein the block copolymer has a molecular weight of greater than about 130,000.

14. The blend of claim 12, wherein the block copolymer is present in an amount of about 10% by weight of the blend.

15. The blend of claim 12, wherein the polycarbonate is bisphenol A polycarbonate.

16. The blend of claim 12, further comprising less than about 50% by weight of an engineering resin.

17. A polycarbonate blend comprising:

a bisphenol A-based polycarbonate; and a hydrogenated styrene-butadiene-styrene triblock copolymer discretely dispersed in the blend, the copolymer being of a molecular weight and present in an amount greater than 5% by weight of the composition and effective to significantly improve the environmental stress crack resistance of the blend relative to the polycarbonate.

18. The blend of claim 17, wherein the triblock copolymer has a molecular weight of greater than about 130,000 and is present in an amount of about 8% to about 12% by weight of the blend.

19. The blend of claim 17, further comprising less than about 50% by weight of an engineering resin selected from the group consisting of acrylonitrile-butadiene-styrene copolymer, polybutylene terephthalate, polyethylene terephthalate, nylon, polyacetal resin and mixture thereof.

20. The blend of claim 18, wherein the triblock copolymer has a molecular weight of about 175,000 and is present in an amount of about 10% by weight of the blend.

* * * * *